(12) United States Patent
Verma et al.

(10) Patent No.: US 10,932,181 B2
(45) Date of Patent: *Feb. 23, 2021

(54) METHOD AND DEVICE FOR INVESTIGATING WIFI DISPLAY SERVICE IN A WIFI DIRECT NETWORK

(71) Applicant: SAMSUNG ELECTRONICS CO., LTD., Suwon-si (KR)

(72) Inventors: Lochan Verma, Seoul (KR); Ii-ju Na, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 163 days.

This patent is subject to a terminal disclaimer.

(21) Appl. No.: 16/050,695

(22) Filed: Jul. 31, 2018

(65) Prior Publication Data
US 2018/0343607 A1 Nov. 29, 2018

Related U.S. Application Data

(63) Continuation of application No. 13/510,548, filed as application No. PCT/KR2010/008084 on Nov. 16, 2010, now Pat. No. 10,117,157.

(Continued)

(51) Int. Cl.
*H04W 48/08* (2009.01)
*H04W 48/16* (2009.01)

(52) U.S. Cl.
CPC .......... *H04W 48/08* (2013.01); *H04W 48/16* (2013.01)

(58) Field of Classification Search
CPC ......... H04L 29/08648; H04L 29/08405; H04L 29/12113; H04L 12/2416; H04L 67/16;

(Continued)

(56) References Cited

U.S. PATENT DOCUMENTS 7,562,131 B2    7/2009 Dutta et al.
7,574,653 B2    8/2009 Crony et al.
(Continued)

FOREIGN PATENT DOCUMENTS

CN    1444357 A    9/2003
JP    2000278298 A    10/2000
(Continued)

OTHER PUBLICATIONS

Communication dated Ocotber 21, 2016 issued by the European Patent Office in counterpart European Patent Application No. 10831771.0.

(Continued)

*Primary Examiner* — Paul H Masur
*Assistant Examiner* — Ellen A Kirillova
(74) *Attorney, Agent, or Firm* — Sughrue Mion, PLLC

(57) ABSTRACT

A method and device for discovering a WiFi display service in a Wi-Fi direct (WFD) network, the method includes: generating a service discovery request frame for discovering a service supported by a second WFD device in the WFD network; transmitting the service discovery request frame to the second WFD device; and receiving a service discovery response frame from the second WFD device in response to the service discovery request frame, wherein the service discovery request frame and the service discovery response frame are generated by using a generic advertising service (GAS) initial request frame of 802.11u and a GAS initial response frame of 802.11u, respectively.

15 Claims, 17 Drawing Sheets

| Field Name | Length | Service Protocol Type | Service Information Type | Service Transaction ID | Service Name |
|---|---|---|---|---|---|
| Values | 3 | 3 | 0 | 1 | - (Non Existent) |

Related U.S. Application Data

(60) Provisional application No. 61/261,850, filed on Nov. 17, 2009.

(58) Field of Classification Search
CPC .... H04L 41/0286; H04W 48/16; H04W 48/08
USPC .......................................................... 370/338
See application file for complete search history.

(56) References Cited

U.S. PATENT DOCUMENTS

| | | | |
|---|---|---|---|
| 2005/0073966 | A1 | 4/2005 | Kim et al. |
| 2005/0091302 | A1 | 4/2005 | Soin et al. |
| 2005/0193106 | A1 | 9/2005 | Desai et al. |
| 2007/0104137 | A1 | 5/2007 | Tang |
| 2007/0109991 | A1 | 5/2007 | Bennett |
| 2007/0141988 | A1 | 6/2007 | Kuehnel et al. |
| 2007/0174887 | A1 | 7/2007 | Iiu et al. |
| 2007/0242645 | A1* | 10/2007 | Stephenson ....... H04W 52/0216 370/338 |
| 2008/0151796 | A1 | 6/2008 | Jokela |
| 2009/0010399 | A1 | 1/2009 | Kim et al. |
| 2009/0046657 | A1* | 2/2009 | Kim .................... H04W 36/005 370/331 |
| 2009/0066704 | A1* | 3/2009 | Daniel ...................... G06F 3/14 345/501 |
| 2010/0275249 | A1* | 10/2010 | McCann ........... H04W 12/0609 726/5 |
| 2011/0010246 | A1 | 1/2011 | Kasslin et al. |
| 2011/0113252 | A1 | 5/2011 | Krischer et al. |

FOREIGN PATENT DOCUMENTS

| | | |
|---|---|---|
| WO | 0186486 A2 | 11/2001 |
| WO | 2009/005282 A1 | 1/2009 |

OTHER PUBLICATIONS

Communication dated Sep. 30, 2014 issued by the Japanese Patent Office in counterpart Japanese Patent Application No. 2012-539807.
Communication, dated Apr. 14, 2014, issued by the Canadian Intellectual Property Office in counterpart Canadian Patent Application No. 2,780,669.
Communication, dated Mar. 19, 2014, issued by the Mexican Patent Office in counterpart Mexican Patent Application No. MX/a/2012/005628.
Communication, dated May 5, 2014, issued by the State Intellectual Property Office of P.R. China in counterpart Chinese Patent Application No. 201080052150.7.
International Search Report (PCT/ISA/210) dated Jul. 29, 2011 in the International Patent Application No. PCT/KR2010/008084.
Necati Canpolat et al.; "Proposal for Link Layer Service Advertisement, Network Discovery"; Intel; IEEE 802.11-08/XXXXR0; Sep. 8, 2008; (12 pages total).
Stephenson et al., "Multi-SI+SID Normative Text", doc.: IEEE 802.11-0611935r0, IEEE P802.11, Wireless LANs, 11-06-1935-00-00u-multi-ssid-normative-text, IEEE-SA Mentor, Piscataway, NJ, USA, Jan. 15, 2007, vol. 802.11u, pp. 1-21, Cisco Systems, Inc., XP017685357.
Wi-Fl Alliance, Wi-Fi Alliance Technical Committee P2P Task Group, "Wi-Fi Peer-to-Peer (P2P) Technical Specification", Version 1.1, Wi-Fi Alliance Specification. Oct. 4, 2010, pp. 1-159, XP009163866.
Written Opinion (PCT/ISA/237) dated Jul. 29, 2011 in the International Patent Application No. PCT/KR2010/008084.

\* cited by examiner

FIG. 4

| Field Name | Size (octets) | Value |
|---|---|---|
| OUI Subtype | 1 | 0x09 |
| Service TLV | Variable | Variable |

FIG. 5

| Field Name | Size (octets) | Value |
|---|---|---|
| Length | 2 | Variable |
| Service Protocol Type | 1 | FIG. 6 |
| Service Information Type | 1 | FIG. 7 |
| Service Transaction ID | 1 | Variable |
| Service Name | Variable | NA |

FIG. 6

| Value | Meaning |
|---|---|
| 0 | All Services |
| 1 | Bonjour |
| 2 | UPnP |
| 3 | Vendor Specific |
| 4-255 | Reserved |

FIG. 7

| Value | Meaning |
|---|---|
| 0 | Service Name |
| 1 | Service Record/Data |
| 2 | Vendor Specific |
| 3-255 | Reserved |

FIG. 8

| Field Name | Size (octets) | Value |
|---|---|---|
| Length | 2 | Variable |
| Service Protocol Type | 1 | FIG. 6 |
| Service Information Type | 1 | FIG. 7 |
| Service Transaction ID | 1 | Variable |
| Status Code | 1 | FIG. 9 |
| Service Information | Variable | Variable |

FIG. 9

| Value | Meaning |
|---|---|
| 0 | Service available |
| 1 | Services not available |
| 2 | Service Protocol Type not available |
| 3 | Service Name not available |
| 4 | Service Record/Service Data not available |
| 5 | Service available but no Service Record/Service Data available |
| 6 | Bad Request |
| 7-255 | Reserved |

FIG. 10

| Field Name | Length | Service Protocol Type | Service Information Type | Service Transaction ID | Service Name |
|---|---|---|---|---|---|
| TLV Values | 3 | 0 | 0 | 1 | — (Non Existent) |

FIG. 11

| Length | Service Protocol Type | Service Information Type | Service Transaction ID | Status Code | Service Name |
|---|---|---|---|---|---|
| 4 + N1 | 3 | 0 | 1 | 0 | WFA_Service_A |

FIG. 12

| Field Name | Length | Service Protocol Type | Service Information Type | Service Transaction ID | Service Name |
|---|---|---|---|---|---|
| Values | 3 | 3 | 0 | 1 | – (Non Existent) |

FIG. 13

| Field Name | Length | Service Protocol Type | Service Information Type | Service Transaction ID | Status Code | Service Information |
|---|---|---|---|---|---|---|
| TLV Values | 4 + N1 | 3 | 0 | 1 | 0 | WFA_Service_α |
| | 4 + N2 | 3 | 0 | 1 | 0 | WFA_Service_β |
| | 4 + N3 | 3 | 0 | 1 | 0 | WFA_Service_X |

FIG. 14

| Value | Meaning |
|---|---|
| 0 | All Services |
| 1 | Bonjour |
| 2 | UPnP |
| 3 | WFD |
| 4 | Vendor Specific |
| 5-255 | Reserved |

FIG. 15

| Value | Meaning |
|---|---|
| 0 | All Services |
| 1 | Bonjour |
| 2 | UPnP |
| 3 | WFD |
| 4-255 | Reserved |

FIG. 16

| Field Name | Length | Service Protocol Type | Service Information Type | Service Transaction ID | Service Name |
|---|---|---|---|---|---|
| Values | 3 | 3 | 0 | 1 | – (Non Existent) |

FIG. 17

| Field Name | Length | Service Protocol Type | Service Information Type | Service Transaction ID | Status Code | Service Information |
|---|---|---|---|---|---|---|
| TLV Values | 4 + N1 | 3 | 0 | 1 | 0 | Service_α |
| | 4 + N2 | 3 | 0 | 1 | 0 | Service_β |
| | 4 + N3 | 3 | 0 | 1 | 1 | Service_Y |

FIG. 18

| Field Name | Length | Service Protocol Type | Service Information Type | Service Transaction ID | Service Name |
|---|---|---|---|---|---|
| Values | 3 + N1 | 3 | 1 | 1 | Service_α |

FIG. 19

| Field Name | Length | Service Protocol Type | Service Information Type | Service Transaction ID | Status Code | Service Information |
|---|---|---|---|---|---|---|
| TLV Values | 4 + N1 | 3 | 1 | 1 | 0 | Service_α_info |

| Value | Meaning |
|---|---|
| 0 x 00 | Device Capability |
| 0 x 01 | Video Profile |
| 0 x 02 | Audio Profile |
| 0 x 03 | Transport Capabilities |
| 0 x 04 | System Information |
| 0 x 05 | Display Capability |
| 0 x 06 | 3D Capability |
| 0 x 07 – 0 x ff | Reserved |

| Bits | Information |
|---|---|
| 0 | Video Source |
| 1 | Video Sink |
| 2 | Audio Source |
| 3 | Audio Sink |
| 4 | Device Available |
| 5 - 7 | Maximum Connections |

| Bits | Information |
|---|---|
| 0 | CP |
| 1 | CEC |
| 1 | Screen |
| 2 - 7 | Reserved |

| Bit(s) | Information |
|---|---|
| 0 - 7 | Horiz Size |
| 8 - 15 | Vertical Size |

| Bit(s) | Profile |
|---|---|
| 0 - 7 | Baseline |
| 8 - 15 | Extended |

| Bit(s) | Level |
|---|---|
| 0 | Level 1 |
| 1 | Level 2 |
| 2-7 | Reserved |

FIG. 29
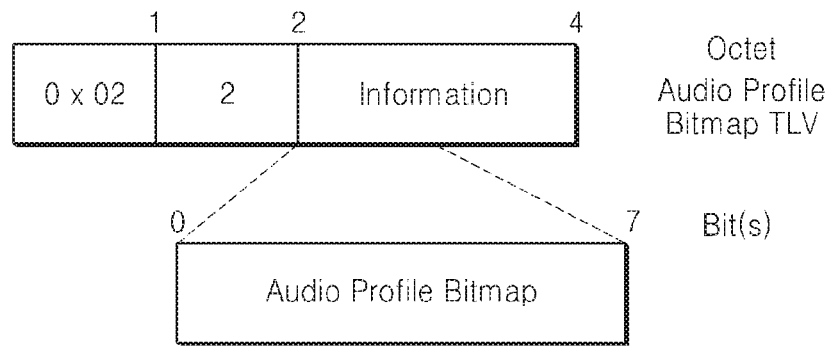
FIG. 30
| Bit(s) | Information |
|---|---|
| 0 | LPCM16-48-x2 |
| 1 | AAC-LC-128 |
| 2 | AC3 |
| 3 | DTS5.1 |
| 4 | LPCM16-48-x6 |
| 5 | E-AC-3 |
| 6 | TrueHD |
| 2 | DTS-HD-MASTER |
FIG. 31
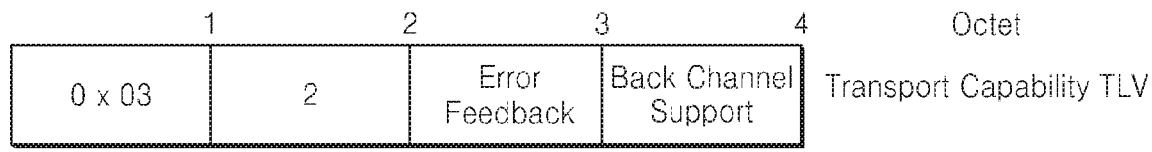

FIG. 32

| Bit(s) | Information |
|---|---|
| 0 | Number of alive RTP session |
| 1 | Max. number of RTP sessions |
| 2 | RTP/AVP |
| 3 | RTP/AVPF |
| 4-7 | Reserved |

FIG. 33

| Bit(s) | Information |
|---|---|
| 0 | Keyboard |
| 1-2 | Pointer |
| 3 | Remote Control |
| 4-7 | Reserved |

FIG. 34

| 1 | 2 | 4 |
|---|---|---|
| 0 x 04 | 46 | Manufacture code |

. . .

| 44 | 46 | 48 |
|---|---|---|
| short product name | | Reserved |

| Bytes | Meaning |
|---|---|
| 4 | Manufacture Code |
| 2 | Product Code |
| 1 | Week of Manufacture |
| 1 | Year of Manufacture |
| 4 | Serial Number |
| 16 | Serial Number Description |
| 16 | Short Product Name |
| 2 | Reserved |

FIG. 37

| Fuction | Bits | Meaning |
|---|---|---|
| Feature | 0 | Pivot |
| | 1 | YCbCr4:4:4 |
| | 2 | YCbCr4:4:2 |
| | 3 | Underscan |
| | 4-7 | Reserved |
| RGB Color Depth | 8 | 24 |
| | 9 | 30 |
| | 10 | 36 |
| | 11 | 48 |
| | 12-15 | Reserved |
| YCbCr 444 Color Depth | 16 | 24 |
| | 17 | 30 |
| | 18 | 36 |
| | 19 | 48 |
| | 20-23 | Reserved |
| YCbCr 442 Color Depth | 24 | 16 |
| | 25 | 24 |
| | 26 | 30 |
| | 27 | 36 |
| | 28-31 | Reserved |
| H Size | 32-47 | Horizontal Size |
| V Size | 48-63 | Vertical Size |
| Reserved | 64-79 | Reserved |

FIG. 38

| 1 | 2 | 3 | 4 |
|---|---|---|---|
| 0 x 06 | 2 | 3D Capability | |

FIG. 39

| Bit(s) | Information |
|---|---|
| 0-7 | Status Code |
| 8 | Frame packing |
| 9 | Field packing |
| 10 | Line alternative |
| 11 | Side-by-Side (Full) |
| 12 | Side-by-Side (Half) |
| 13 | L+depth |
| 14 | L+depth+Gfx+G-depth |
| 15 | Frame Sequential |

METHOD AND DEVICE FOR INVESTIGATING WIFI DISPLAY SERVICE IN A WIFI DIRECT NETWORK

CROSS-REFERENCE TO RELATED APPLICATIONS

This application is a Continuation Application of U.S. application Ser. No. 13/510,548, filed May 17, 2012, which is a National Stage Application of International Application No. PCT/KR2010/008084, filed Nov. 16, 2010, which claims priority from U.S. Provisional Patent Application No. 61/261,850, filed on Nov. 17, 2009, the contents of all of which are incorporated herein by reference in their entirety.

TECHNICAL FIELD

Exemplary embodiments relate to a method and device for discovering a WiFi display service in a Wi-Fi direct (WFD) network, and more particularly, to a method and device for discovering a WiFi display service in a WFD network, which may be used by devices within the WFD network in a layer 2 pre-association stage, by using an 802.11u generic advertising service (GAS) initial request frame and an 802.11u GAS initial response frame.

RELATED ART

A Wi-Fi direct (WFD) network is a network system suggested by the Wi-Fi Alliance and enables Wi-Fi devices to be connected to each other in a peer-to-peer fashion without participating in a home network, an office network, or a hot-spot network.

Devices within a WFD network may be capable of discovering information regarding each other, e.g., capability information. For the discovery of information regarding devices and supported service capabilities, discovery protocols corresponding to layer 3 or higher of the 7-layer OSI model have been used in the related art. Layer 3 or higher protocols include universal plug and play (UPnP), the simple service discovery protocol (SSDP), zero configuration networking (ZeroConf), and DNS service discovery (DNS-SD).

However, an operation of determining services that may be supported by a device by using a layer 3 or higher protocol starts after a layer 2 connection to a corresponding device is established. If the corresponding device is then determined as a device unable to satisfy service demands of a user, it is necessary to terminate the existing layer 2 connection to the corresponding device, establish a new layer 2 connection to a new device, and discover services that may be supported by the new device.

Therefore, considering that a small mobile device has a small battery capacity, a new method for discovery of services that may be supported by a device in a layer 2 pre-association stage is necessary for improved energy efficiency and user experience.

DETAILED DESCRIPTION OF THE INVENTIVE CONCEPT

According to an aspect of an exemplary embodiment, there is provided a method and device for discovering a WiFi display service in a WFD network, which may be used by devices within the WFD network in a layer 2 pre-association stage, by using an 802.11u generic advertising service (GAS) initial request frame and an 802.11u GAS initial response frame.

Advantageous Effects

According to an aspect of an exemplary embodiment, after information included in a service discovery response frame regarding services supported by a Wi-Fi direct (WFD) device is recognized, a layer 2 secure connection to the WFD device may be selectively established only if the WFD device is a device satisfying demands of a user. Therefore, a device satisfying the demands of a user may be selected from among a plurality of WFD devices in a layer 2 pre-association stage Repetitive layer 2 connection establishments for discovering a device supporting services desired by a user may be avoided by discovering services supported by each WFD device in a layer 2 pre-association stage, and thus, battery consumption may be reduced, and user experience may be improved.

According to an aspect of an exemplary embodiment, formats of exchanged frames and operations of transmitting the exchanged frames are simplified to minimize costs and complexity of embodying service discovery prior to a layer 2 connection and to enable easy connection establishment between WFD devices within a WFD network.

DESCRIPTION OF THE DRAWINGS

FIG. 4 shows a service discovery request/response frame according to an aspect of an exemplary embodiment;

FIG. 5 shows a service discovery request type-length-value (TLV) of a service discovery request frame according to an aspect of an exemplary embodiment;

FIG. 6 is shows a service protocol type according to an aspect of an exemplary embodiment;

FIG. 7 is shows a service information type according to an aspect of an exemplary embodiment;

FIG. 8 shows a service discovery response TLV of a service discovery response frame according to an aspect of an exemplary embodiment;

FIG. 9 shows a status code of a service discovery response frame according to an aspect of an exemplary embodiment;

FIG. 10 shows a service discovery request frame including identifiers of all protocols according to an aspect of an exemplary embodiment;

FIG. 11 shows a service discovery response frame including an identifier of a vendor expansion protocol according to an aspect of an exemplary embodiment;

FIG. 12 shows a service discovery request frame including an identifier of a vendor expansion protocol according to an aspect of an exemplary embodiment;

FIG. 13 shows a service discovery response frame including an identifier of a vendor expansion protocol according to an aspect of an exemplary embodiment;

FIG. 14 shows a service protocol type including an identifier of a WiFi display protocol and an identifier of a vendor expansion protocol according to another aspect of an exemplary embodiment;

FIG. 15 shows a service protocol type including an identifier of a WiFi display protocol according to another aspect of an exemplary embodiment;

FIG. 16 shows a service discovery request frame including an identifier including a WiFi display protocol according to another aspect of an exemplary embodiment;

FIG. 17 shows a service discovery response frame including an identifier of a WiFi display protocol according to another aspect of an exemplary embodiment;

FIG. 18 shows a service discovery request frame for requesting service information detail according to another aspect of an exemplary embodiment;

FIG. 19 shows a service discovery response frame including service information according to another aspect of an exemplary embodiment;

FIG. 29 shows an audio profile TLV according to an aspect of an exemplary embodiment;

FIG. 30 shows an audio profile bitmap field of an audio profile TLV according to an aspect of an exemplary embodiment;

FIG. 31 shows a transport capability TLV according to an aspect of an exemplary embodiment;

FIG. 32 shows an error feedback field of a transport capability TLV according to an aspect of an exemplary embodiment;

FIG. 33 shows a back channel support field of a transport capability TLV according to an aspect of an exemplary embodiment;

FIG. 34 shows a system information TLV according to an aspect of an exemplary embodiment;

FIG. 37 shows a field of a display capability TLV according to an aspect of an exemplary embodiment;

FIG. 38 shows a 3D capability TLV according to an aspect of an exemplary embodiment;

FIG. 39 shows a field of a 3D capability TLV according to an aspect of an exemplary embodiment;

SUMMARY

Figure 1:
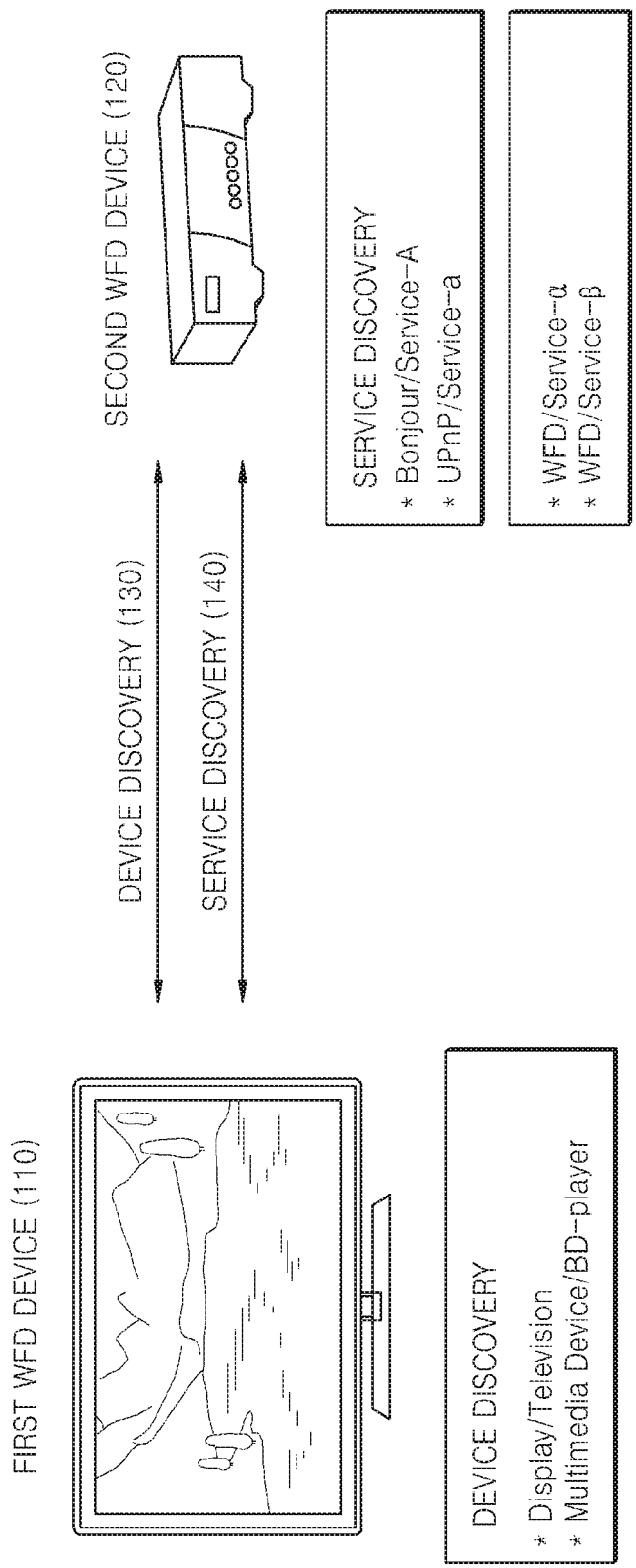
FIG. 1 shows a WiFi display service discovery method in a Wi-Fi direct (WFD) network, according to an exemplary embodiment.

According to an aspect of an exemplary embodiment, a method in which a first Wi-Fi direct (WFD) device discovers a WiFi display service in a WFD network includes: generating a service discovery request frame for discovering a service supported by a second WFD device in the WFD network; transmitting the service discovery request frame to the second WFD device; and receiving a service discovery response frame from the second WFD device in response to the service discovery request frame, wherein the service discovery request frame and the service discovery response frame are generated by using a generic advertising service (GAS) initial request frame of 802.11u and a GAS initial response frame of 802.11u, respectively.

The GAS initial request frame of 802.11u may include a service protocol type, a service information type, and a service name, the service protocol type may include identifiers of all protocols or may include an identifier for identifying a WiFi display protocol or an identifier of a vendor expansion protocol The service information type may include an identifier corresponding to any one of information regarding a service name, service information detail, and vendor expansion information, and the service name may include a name of a corresponding service of which service information is to be requested.

The GAS initial response frame of 802.11u may include a service protocol type, a service information type, a status code, and service information. The service protocol type may include an identifier for identifying a requested WiFi display service or an identifier of a vendor expansion protocol. The service information type may include an identifier corresponding to any one of information requested from among a service name, service information detail, and vendor expansion information, the status code may include information regarding a result of a service information request, and the service information may include service information requested based on the service information type.

The service information may include at least one of device capability information, video profile information, audio profile information, transport capability information, system information, display capability information, and three-dimensional (3D) capability information, and an identifier thereof.

The method may further include selectively establishing a layer 2 secure connection to the second WFD device based on information regarding services supported by the second WFD device, which is included in the service discovery response frame.

The first WFD device and the second WFD device may be Wi-Fi display certified devices.

According to another aspect of an exemplary embodiment, a method that a second Wi-Fi direct (WFD) device discovers a WiFi display service in a WFD network includes: receiving a service discovery request frame for discovering a service supported by the second WFD device of the WFD network from a first WFD device; generating a service discovery response frame in response to the service discovery request frame; and transmitting the service discovery response frame to the first WFD device, wherein the service discovery request frame and the service discovery response frame are generated by using a GAS initial request frame of 802.11u and a GAS initial response frame of 802.11u, respectively.

The GAS initial request frame of 802.11u may include a service protocol type, a service information type, and a service name. The service protocol type may include identifiers of all protocols or may include an identifier for identifying a WiFi display protocol or an identifier of a vendor expansion protocol. The service information type may include an identifier corresponding to any one of information regarding a service name, service information detail, and vendor expansion information, and the service name may include a name of a corresponding service of which service information is to be requested.

The GAS initial response frame of 802.11u may include a service protocol type, a service information type, a status code, and service information. The service protocol type may include an identifier for identifying a requested WiFi display service or an identifier of a vendor expansion protocol. The service information type may include an identifier corresponding to any one of information requested from among a service name, service information detail, and vendor expansion information, the status code may include information regarding a result of a service information request, and the service information may include service information requested based on the service information type.

The service information may include at least one of device capability information, video profile information, audio profile information, transport capability information, system information, display capability information, and three-dimensional (3D) capability information, and an identifier thereof.

The first WFD device and the second WFD device may be Wi-Fi display certified devices.

According to another aspect of an exemplary embodiment, there is provided a computer-readable recording medium having recorded thereon a computer program for executing the above-described method.

According to another aspect of an exemplary embodiment, a first WFD device in a WFD network includes: a frame generating unit for generating a service discovery request frame for discovering a service supported by a second WFD device in the WFD network; a frame transmitting unit for transmitting the service discovery request frame to the second WFD device; and a frame receiving unit for receiving a service discovery response frame from the second WFD device in response to the service discovery request frame, wherein the service discovery request frame and the service discovery response frame are generated by using an 802.11u generic advertising service (GAS) initial request frame and an 802.11u GAS initial response frame, respectively.

According to another aspect of an exemplary embodiment, a second WFD device in a WFD network includes: a frame receiving unit for receiving a service discovery request frame for discovering a service supported by the second WFD device of the WFD network from a first WFD device; a frame generating unit for generating a service discovery response frame in response to the service discovery request frame; and a frame transmission unit for transmitting the service discovery response frame to the first WFD device, wherein the service discovery request frame and the service discovery response frame are generated by using an 802.11 u GAS initial request frame and an 802.11u GAS initial response frame, respectively.

DETAILED DESCRIPTION OF EXEMPLARY EMBODIMENTS

Hereinafter, the inventive concept will be described in detail by explaining exemplary embodiments with reference to the attached drawings. Like reference numerals in the drawings denote like elements. In the drawings, the thicknesses of layers and regions may be exaggerated for clarity.

FIG. 1 is a diagram showing a WiFi display service discovery method in a Wi-Fi direct (WFD) network, according to an aspect of an exemplary embodiment.

The WFD network may include one or more WFD devices, e.g., a first WFD device 110 and a second WFD device 120. Hereinafter, the WFD network has the same meaning as a WiFi peer-to-peer (P2P) network. Examples of the WFD devices may include devices supporting a Wi-Fi display service, e.g., a display device, a printer, a digital camera, a projector, a mobile phone, or the like. The WFD devices include Wi-Fi display certified devices.

WFD devices within a WFD network may be directly connected to each other without using a wireless local area network (WLAN) access point (AP). To this end, the WFD devices may use a new firmware protocol.

In FIG. 1, the first WFD device 110 is a television (TV), whereas the second WFD device 120 is a set-top box. The first WFD device 110 and the second WFD device 120 may form a WFD network by establishing a direct peer-to-peer connection to each other.

The first WFD device 110 and the second WFD device 120 perform device discovery 130 on each other prior to establish a layer 2 secure connection. The device discovery 130 uses a probe request frame and a probe response frame in order to exchange device information. When the first WFD device 110 is a group owner of a WFD network, the first WFD device 110 transmits device information of the first WFD device 110 by responding to the probe request frame transmitted by the second WFD device 120 with the probe response frame.

The device information includes information regarding a device type and a device sub-type. In FIG. 1, a device type of the first WFD device 110 may be a "display" and a sub-type of the first WFD device 110 may be a "TV".

Then, the first WFD device 110 and the second WFD device 120 perform service discovery 140 on each other.

The service discovery 140 uses a service discovery request frame and a service discovery response frame in order to exchange service information provided by a WFD device. The service discovery request frame and the service discovery response frame are generated by using an 802.11u generic advertising service (GAS) initial request frame and an 802.11u GAS initial response frame, respectively. Fields of the service discovery request frame and the service discovery response frame will be described in detail with reference to FIGS. 4 through 9.

According to an aspect of an exemplary embodiment, after service information included in the service discovery response frame regarding services supported by a WFD device is recognized, a layer 2 secure connection to the WFD device may be selectively established only if the second WFD device is a device satisfying demands of a user. Therefore, a device satisfying demands of a user may be selected from among a plurality of WFD devices in a layer 2 pre-association stage.

Repetitive layer 2 connection establishments for discovering a device supporting services desired by a user may be avoided by discovering services supported by each WFD device in a layer 2 pre-association stage, and thus battery consumption may be reduced and user experience may be improved.

According to an aspect of an exemplary embodiment, formats of exchanged frames and operations of transmitting the exchanged frames are simplified to minimize costs and complexity of embodying service discovery prior to a layer 2 connection and to enable easy connection establishment between WFD devices within a WFD network.

Figure 2:
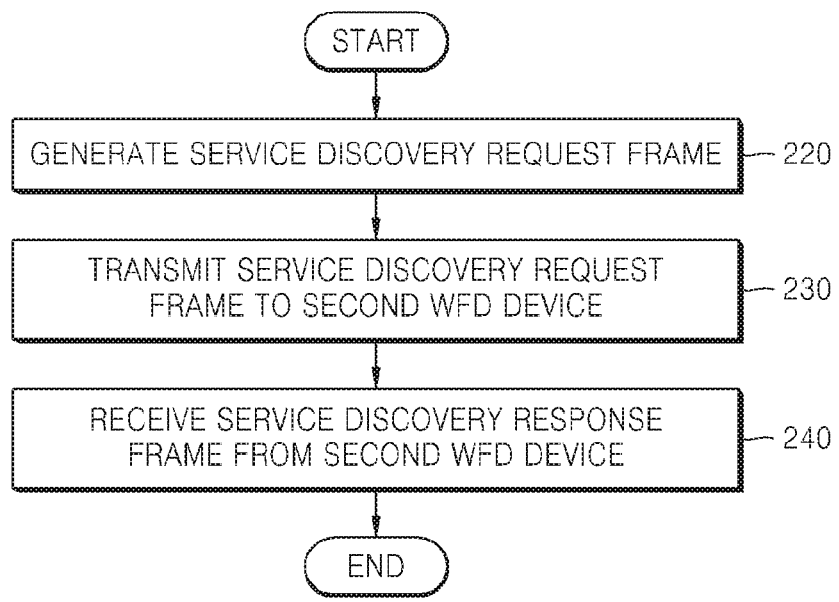
FIG. 2 is a flowchart showing that a first WFD device requests service discovery in a WFD network according to an aspect of an exemplary embodiment.

FIG. 2 is a flowchart showing that a first WFD device requests service discovery in a WFD network according to an aspect of an exemplary embodiment.

In a WFD network according to an aspect of an exemplary embodiment, WFD devices discover services that may be supported by the WFD devices in a layer 2 pre-association stage.

In operation 220, the first WFD device generates a service discovery request frame for discovery of services supported by a second WFD device in the WFD network.

In operation 230, the first WFD device transmits the service discovery request frame to the second WFD device.

In operation 240, the first WFD device receives a service discovery response frame from the second WFD device in response to the service discovery request frame.

A service discovery request frame and a service discovery response frame according to an aspect of an exemplary embodiment are generated by using an 802.11u GAS initial request frame and an 802.11u GAS initial response frame, respectively.

Figure 3:
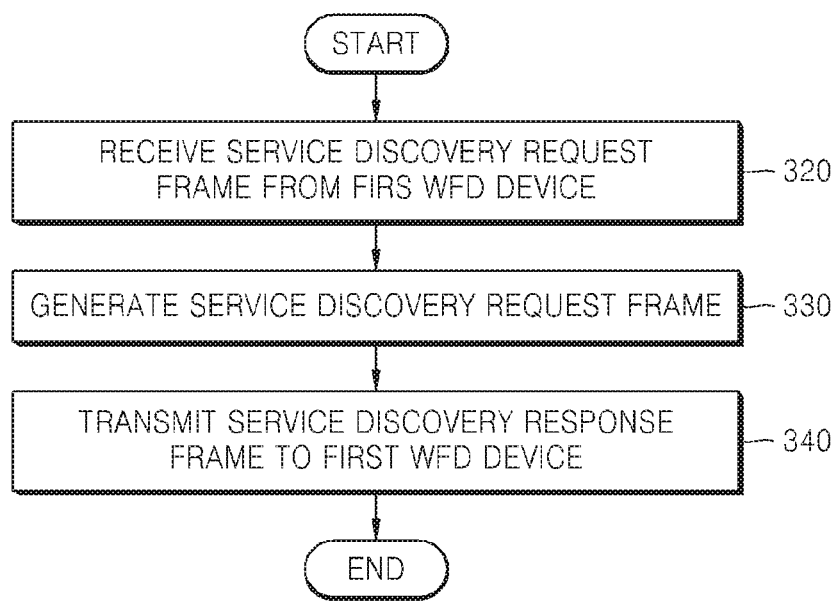
FIG. 3 is a flowchart showing that a second WFD device responds to a service discovery request in a WFD network according to an aspect of an exemplary embodiment.

FIG. 3 is a flowchart showing that a second WFD device responds to a service discovery request in a WFD network according to an aspect of an exemplary embodiment.

In operation 320, the second WFD device receives a service discovery request frame from a first WFD device.

In operation 330, the second WFD device generates a service discovery response frame in response to the service discovery request frame.

In operation 340, the second WFD device transmits the service discovery response frame to the first WFD device.

FIG. 4 shows a service discovery request/response frame according to an aspect of an exemplary embodiment.

The service discovery request frame and the service discovery response frame are generated by using an 802.11u GAS initial request frame and an 802.11u GAS initial response frame, respectively. In more detail, vendor expansion fields of the service discovery request/response frame.

As shown in FIG. 4, the field "Organizationally Unique Identifier (OUI) Subtype" and the field "Service type-length-value (TLV)" including a service discovery response TLV of the GAS initial request/response frame may have sizes of 1 octet and a variable size, respectively.

The field "OUI" includes an identifier allocated to an organization. In FIG. 4, the field "OUI Subtype" has a value "0x09" for identifying the organization, that is, WiFi Alliance (WFA).

FIG. 5 is a diagram showing a service discovery request TLV of a service discovery request frame according to an aspect of an exemplary embodiment.

The service discovery request TLV includes fields including "Length", "Service Protocol Type", "Service Information Type", "Service Transaction ID", and "Service Name" where the fields have sizes of 2 octets, 1 octet, 1 octet, and variable octets, respectively.

The field "Length" includes a length of a service discovery request TLV.

The field "Service Protocol Type" includes a service protocol type, which will be described below with reference to FIG. 6.

The field "Service Information Type" includes a service information type, which will be described below with reference to FIG. 7.

The field "Service Transaction ID" includes an identifier for corresponding a service discovery request frame and a service discovery response frame to each other. The field "Service Transaction ID" is set to a random value other than 0 when a service discovery request frame is generated.

The field "Service Name" includes a service name of a service that is a target of an information detail request, which is encoded in UTF-8 based on the field "Service Protocol Type". When the field "Service Protocol Type" is the field "Vendor Specific", the field "Service Name" starts from a value of the field "OUI" of a vendor.

FIG. 6 is a diagram showing a service protocol type according to an aspect of an exemplary embodiment.

As shown in FIG. 6, the service protocol type may include any one value of 0 to 255. 0 indicates identifiers of all protocols, 1 indicates an identifier of a Bonjour protocol, 2 indicates an identifier of a UPnP protocol, 3 indicates an identifier of a vendor expansion protocol, and 4 through 255 indicate reserved identifiers.

FIG. 7 is a diagram showing a service information type according to an aspect of an exemplary embodiment.

As shown in FIG. 7, the service information type may include any one of 0 through 255. 0 indicates a service name, 1 indicates service information detail, 2 indicates vendor expansion information, and 3 through 255 indicate reserved identifiers.

When all service lists of service protocol types of all upper layers are requested by using a service discovery request frame, the service discovery request frame includes a single service discovery request TLV including '0' of the field "Service Protocol Type" and '0' of the field "Service Information Type".

When all service lists of a service protocol type of a predetermined upper layer are requested by using a service discovery request frame, the service discovery request frame includes a single service discovery request TLV including an identifier for identifying the service protocol type by using the field "Service Protocol Type" and '0' of the field "Service Information Type".

When predetermined service information of a service protocol type of a predetermined upper layer is requested by using a service discovery request frame, the service discovery request frame includes an identifier for identifying the service protocol type by using the field "Service Protocol Type", an identifier for identifying any one of service information detail or vendor expansion information by using the field "Service Information Type", and a service name of a service that is a target of a service information request using the field "Service Name".

When a plurality of pieces of service information of a service protocol type of a plurality of upper layers are requested by using a service discovery request frame, the service discovery request frame includes a plurality of service discovery request TLVs. Each service discovery request TLV includes an identifier for identifying a predetermined service protocol type by using the field "Service Protocol Type", and an identifier for identifying any one of service information detail or vendor expansion information by using the field "Service Information Type".

FIG. 8 shows a service discovery response TLV of a service discovery response frame according to an aspect of an exemplary embodiment.

The service discovery response TLV includes fields including "Length", "Service Protocol Type", "Service Information Type", "Service Transaction ID", "Status Code", and "Service Information" where the fields have sizes of 2, 1, 1, 1, and variable octets, respectively.

The field "Length" includes a length value of the service discovery response TLV.

The field "Service Protocol Type" includes a service protocol type and has a value as shown in FIG. 6.

The field "Service Information Type" includes a service information type and has a value as shown in FIG. 7.

The field "Service Transaction ID" includes an identifier for corresponding a service discovery request frame and a service discovery response frame to each other. The field "Service Transaction ID" is set to a value included in a service discovery request frame to indicate that the corresponding service discovery response frame is generated in response to the service discovery request frame.

The field "Status Code" includes a status code of a requested service, which will be described below with reference to FIG. 9.

The field "Service Information" includes any one of a service name, service information detail, and vendor expansion information, based on the field "Service Information Type".

The service name is obtained by encoding a predetermined service name, which is served by a service protocol type identified by the field "Service Protocol Type", in UTF-8.

The service information detail is obtained by encoding predetermined service information detail, which is served by a service protocol type identified by the field "Service Protocol Type", in UTF-8. When the field "Service Protocol Type" is the field "Vendor Specific", the service information detail starts from a value of the field "OUI" of a vendor.

The vendor expansion information is obtained by encoding vendor expansion information of a predetermined service, which is served by a service protocol type identified by the field "Service Protocol Type", in UTF-8. The vendor expansion information starts from a value of the field "OUI" of a vendor.

The field "Service Information" will be described below with reference to FIGS. 20 through 39.

FIG. 9 is a diagram showing a status code of a service discovery response frame according to an aspect of an exemplary embodiment.

As shown in FIG. 9, the status code may include any one value of 0 through 255. 0 indicates a state where a service is available, 1 indicates a state where a service is not available, 2 indicates a state where a service protocol type is not available, 3 indicates a state where a service name is not available, 4 indicates a state where service information detail (e.g., service record/service data) is not available, 5 indicates a state where a service is available whereas service information detail (e.g., service record/service data) is not available, 6 indicates an inappropriate request, and 7 through 255 indicates reserved status codes.

When all service lists of service protocol types of all upper layers are responded by using a service discovery response frame, the service discovery response frame includes a plurality of service discovery response TLVs. Each service discovery response TLV includes an identifier for identifying a predetermined service protocol type (e.g., Bonjour, UPnP, or the like) by using the field "Service Protocol Type", an identifier for identifying the field "Service Name" by using the field "Service Information Type", a value of the field "Service Transaction ID" included in the service discovery request frame, a status code value indicating whether a service is available by using the field "Status Code", and a service name of the field "Service Information". When there is no available service, the service discovery response frame includes a single service discovery response TLV. The service discovery response TLV includes '0' of the field "Service Protocol Type", '0' of the field "Service Information Type", a predetermined error status code value of the field "Status Code", and a value "Null" of the field "Service Information".

When all service lists of a service protocol type of a predetermined upper layer is responded by using a service discovery response frame, the service discovery response frame includes a plurality of service discovery response TLVs. Each service discovery response TLV includes an identifier for identifying a requested service protocol type (e.g., Bonjour, UPnP, or the like) by using the field "Service Protocol Type", an identifier for identifying the field "Service Name" by using the field "Service Information Type", a value of the field "Service Transaction ID" included in the service discovery request frame, a status code value indicating whether a service is available by using the field "Status Code", and a service name of the field "Service Information". When there is no available service, the service discovery response frame includes a single service discovery response TLV. The service discovery response TLV includes an identifier for identifying a requested service protocol type by using the field "Service Protocol Type", '0' of the field "Service Information Type", a predetermined error status code value of the field "Status Code", and a value "Null" of the field "Service Information".

When predetermined service information of a service protocol type of a predetermined upper layer is responded by using a service discovery response frame, the service discovery response frame includes a single service discovery response TLV. The service discovery response TLV includes an identifier for identifying a requested service protocol type by using the field "Service Protocol Type", an identifier for identifying any one of service information detail and vendor expansion information by using the field "Service Information Type", a value of the field "Service Transaction ID" included in the service discovery request frame, a status code value indicating whether a service is available by using the field "Status Code", and service information detail or vendor expansion information that is requested by using the field "Service Information". When the predetermined service is not available, a single service discovery response TLV includes a predetermined error status code value based on the field "Status Code" and a service name of an unavailable service based on the field "Service Information".

When a plurality of pieces of service information of a service protocol type of a plurality of upper layers are responded by using a service discovery response frame, the service discovery response frame includes a plurality of service discovery response TLVs. Each service discovery response TLV includes an identifier for identifying a requested service protocol type by using the field "Service Protocol Type", an identifier for identifying any one of service information detail and vendor expansion information by using the field "Service Information Type", a value of the field "Service Transaction ID" included in the service discovery request frame, a status code value indicating whether a service is available by using the field "Status Code", and an identifier for identifying any one of service information detail and vendor expansion information by using the field "Service Information". When the predetermined service is not available, a service discovery response TLV corresponding to the service includes a predetermined error status code value based on the field "Status Code" and an unavailable service name based on the field "Service Information".

FIG. 10 is a diagram showing a service discovery request frame including identifiers of all protocols according to an aspect of an exemplary embodiment.

FIG. 10 shows a case where all service lists of a service protocol type (a value of the field "Service Protocol Type" is 0) of all upper layers are requested by using the service discovery request frame.

FIG. 11 is a diagram showing a service discovery response frame including an identifier of a vendor expansion protocol according to an aspect of an exemplary embodiment.

FIG. 11 shows the service discovery response frame in response to the service discovery request frame of FIG. 10. The service discovery response frame includes a single service discovery response TLV. The service discovery response TLV includes an identifier of a vendor expansion protocol type of the field "Service Protocol Type", an identifier of "Service Name" of the field "Service Information Type", a value included in the service discovery request frame of the field "Service Transaction ID", a status code value indicating whether a service is available by using the field "Status Code", and a service name of the field "Service Information". A vendor expansion service according to an aspect of an exemplary embodiment is a WiFi display service suggested by the WFA, and thus, a service name thereof starts from "WFA". The field "Length" is calculated according to 4+ length of the field "Service Information".

FIG. 12 is a diagram showing a service discovery request frame including an identifier of a vendor expansion protocol according to an aspect of an exemplary embodiment.

FIG. 12 shows a case where all service lists of a vendor expansion protocol (a value of the field "Service Protocol Type" is 3) are requested by using the service discovery request frame.

FIG. 13 is a diagram of a service discovery response frame including an identifier of a vendor expansion protocol according to an aspect of an exemplary embodiment.

FIG. 13 shows a service discovery response frame in response to the service discovery request frame of FIG. 12. The service discovery response frame includes a plurality of service discovery response TLVs. The service discovery response TLV includes an identifier of a vendor expansion protocol of the field "Service Protocol Type", an identifier of "Service Name" of the field "Service Information Type", a value included in the service discovery request frame of the field "Service Transaction ID", a status code value indicating whether a service is available or not by using the field "Status Code", and a service name (e.g., WFA_Service_α, WFA_Service_β, and WFA_Service_χ) of the field "Service Information". A vendor expansion service according to an aspect of an exemplary embodiment is a WiFi display service suggested by the WFA, and thus, a service name thereof starts from "0x0052F2" that is an OUI value of WFA. The field "Length" is calculated according to 4+ length of the field "Service Information".

FIG. 14 shows a diagram showing a service protocol type including an identifier of a WiFi display protocol and an identifier of a vendor expansion protocol according to another aspect of an exemplary embodiment.

According to another aspect of an exemplary embodiment, the service protocol type may include any one value of 0 to 255. 0 indicates identifiers of all protocols, 1 indicates an identifier of a Bonjour protocol, 2 indicates an identifier of a UPnP protocol, 3 indicates an identifier of a WiFi display protocol, 4 indicates an identifier of a vendor expansion protocol, and 5 through 255 indicate reserved identifiers.

That is, in order to discover a WiFi display service, an identifier of a WiFi display protocol is further defined to a service protocol type.

FIG. 15 is a diagram showing a service protocol type including an identifier of a WiFi display protocol according to another aspect of an exemplary embodiment.

According to another aspect of an exemplary embodiment, the service protocol type may include any one of 0 to 255. 0 indicates identifiers of all protocols, 1 indicates an identifier of a Bonjour protocol, 2 indicates an identifier of a UPnP protocol, 3 indicates an identifier of a WiFi display protocol, and 4 through 255 indicate reserved identifiers. FIG. 15 shows a case where an identifier of a vendor expansion protocol is not defined.

FIG. 16 is a diagram showing a service discovery request frame including an identifier including a WiFi display protocol according to another aspect of an exemplary embodiment.

FIG. 16 shows a case where all service lists of a WiFi display protocol (a value of the field "Service Protocol Type" is 3) are requested by using the service discovery request frame.

FIG. 17 is a diagram of a service discovery response frame including an identifier of a WiFi display protocol according to another aspect of an exemplary embodiment.

FIG. 17 shows a service discovery response frame in response to the service discovery request frame of FIG. 16. The service discovery response frame includes a plurality of service discovery response TLVs. The service discovery response TLV includes an identifier of a WiFi display protocol of the field "Service Protocol Type", an identifier of the "Service Name" of the field "Service Information Type", a value included in the service discovery request frame of the field "Service Transaction ID", a status code value indicating whether a service is available or not by using the field "Status Code", and a service name (e.g., Service_α, Service_β, and Service_χ) of the field "Service Information". The field "Length" is calculated according to 4+ length of the field "Service Information".

FIG. 18 shows a service discovery request frame for requesting service information detail according to another aspect of an exemplary embodiment.

FIG. 18 shows a case where service information of "Service_α" of a WiFi display protocol (a value of the field "Service Protocol Type" is 3) is requested by using the service discovery request frame. The service discovery request frame includes a single service discovery request TLV. The service discovery request TLV includes an identifier of a WiFi display protocol of the field "Service Protocol Type", an identifier corresponding to the service information detail of the field "Service Information Type", and "Service_α" that is a service name of the field "Service Name".

FIG. 19 is a diagram of a service discovery response frame including service information according to another aspect of an exemplary embodiment.

FIG. 19 shows the service discovery response frame in response to the service discovery request frame of FIG. 18. The service discovery response frame includes a single service discovery response TLV. The service discovery response TLV includes an identifier of a WiFi display protocol of the "Service Protocol Type", an identifier corresponding to service information detail of the field "Service Information Type", a value included in the service discovery request frame of the field "Service Transaction ID", a status code value indicating whether a service is available by using the field "Status Code", and information detail of the requested service "Service_α" of the field "Service Information". The field "Length" is calculated according to 4+ length of the field "Service Information".

Figures 20, 21:
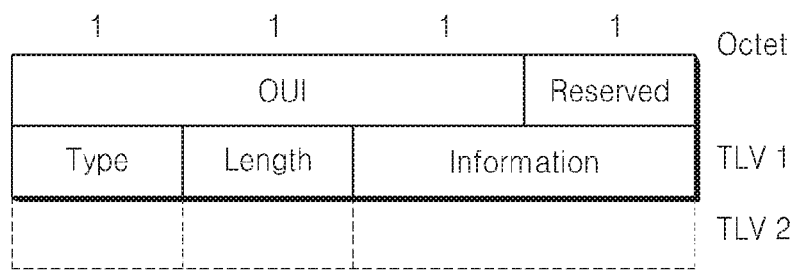
FIG. 20 shows a service information field of a service discovery response frame according to an aspect of an exemplary embodiment.
FIG. 21 shows an information identifier (or an information type) of a service information field according to an aspect of an exemplary embodiment.

FIG. 20 is a diagram showing a service information field of a service discovery response frame according to an aspect of an exemplary embodiment.

According to an aspect of an exemplary embodiment, a vendor expansion service is a WiFi display service suggested by the WFA, the service information field starts from an OUI value of WFA of 3 octets. The service information field includes at least one TLV including service information. The field "Type" has 1 octet and defines a type of service information. The field "Length" has 1 octet and defines a length of the field "Information". The field "Information" has a variable length and includes actual service information.

FIG. 21 is a diagram showing an information identifier (or an information type) of a service information field according to an aspect of an exemplary embodiment.

The information identifier (or the field "Type") of the service information field identifies various capabilities supported by a WiFi display service. The field "Type" has a size of 1 octet. According to the present embodiment, values from "0x00" to "0x06" are respectively allocated to particular capabilities and values from "0x07" to "0xff" are reserved.

If a value of the field "Type" is "0x00", the value indicates capability information of a WFD device. The capability information of a WFD device will be described below in detail with reference to FIGS. 22 through 25.

If a value of the field "Type" is "0x01", the value indicates video profile information of the WFD device. The video profile information will be described below in detail with reference to FIGS. 26 through 28.

If a value of the field "Type" is "0x02", the value indicates audio profile information of the WFD device. The audio profile information will be described below in detail with reference to FIGS. 29 through 30.

If a value of the field "Type" is "0x03", the value indicates transport capability information of the WFD device. The transport capability information will be described below in detail with reference to FIGS. 31 through 33.

If a value of the field "Type" is "0x04", the value indicates information corresponding to a system level of the WFD device. The information corresponding to a system level of the WFD device will be described below in detail with reference to FIGS. 34 through 35.

If a value of the field "Type" is "0x05", the value indicates display capability information. The display capability information will be described below in detail with reference to FIGS. 36 through 37.

If a value of the field "Type" is "0x06", the value indicates three-dimensional (3D) capability information of the WFD device. The 3D capability information will be described below in detail with reference to FIGS. 38 through 39.

Figures 22, 23, 24:
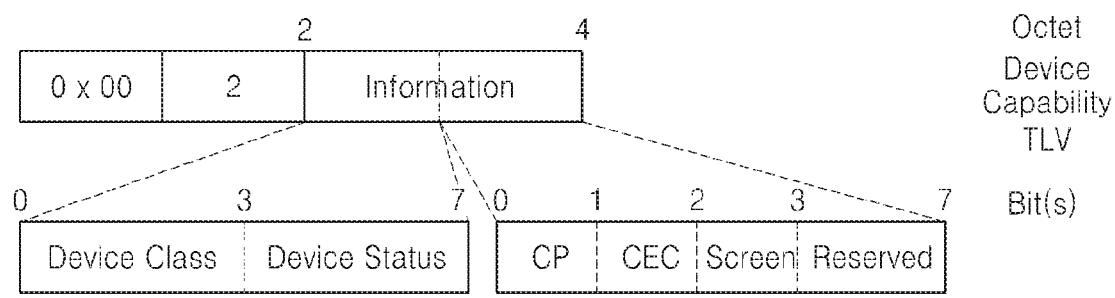
FIG. 22 shows a device capability TLV according to an aspect of an exemplary embodiment.
FIG. 23 shows device class and device status sub-fields of a device capability TLV according to an aspect of an exemplary embodiment.
FIG. 24 shows content protection (CP)/consumer electronic control (CEC)/Screen sub-fields of a device capability TLV according to an aspect of an exemplary embodiment.

FIG. 22 is a diagram showing a device capability TLV according to an aspect of an exemplary embodiment.

A value of the field "Type" of the device capability TLV is "0x00" and a value of the field "Length" is 2. The device capability TLV includes the field "Information" having 2 octets. In detail, the field "Information" includes a device class sub-field, a device status sub-field, content protection (CP)/consumer electronic control (CEC)/screen sub-fields.

FIG. 23 is a diagram showing device class and device status sub-fields of a device capability TLV according to an aspect of an exemplary embodiment.

The device class sub-field includes a bit for determining whether a device is a source of video transmission, a bit for determining whether a device is a video receiving device, a bit for determining whether a device is a source of audio transmission, and a bit for determining whether a device is an audio receiving device. The device status sub-field includes a bit for determining whether a connection may be established and three bits for determining the maximum number of remote desktop services (RDSs) to be connected.

FIG. 24 is a diagram showing CP/CEC/Screen sub-fields of a device capability TLV according to an aspect of an exemplary embodiment.

Each of the CP, CEC, and Screen fields includes a bit for determining whether high-bandwidth digital content protection (HDCP) is supported, a bit for determining whether CEC is supported, and a bit for determining whether a WFD device has a display panel. If the WFD device has the display panel and the Screen field is set 1, a field for determining the display size of the WFD device, as shown in FIG. 25, is further added.

Figures 25, 26, 27, 28:
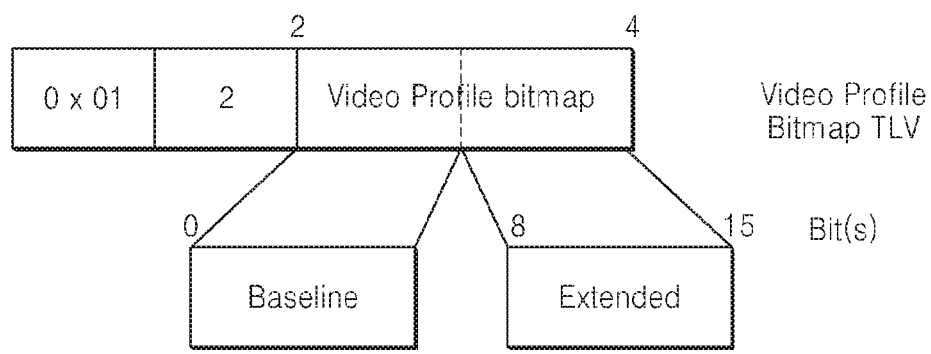
FIG. 25 shows a screen option field of a device capability TLV according to an aspect of an exemplary embodiment.
FIG. 26 shows a video profile TLV according to an aspect of an exemplary embodiment.
FIG. 27 shows a video profile bitmap of a video profile TLV according to an aspect of an exemplary embodiment.
FIG. 28 shows a baseline sub-field of a video profile TLV according to an aspect of an exemplary embodiment.

FIG. 25 is a diagram showing a screen option field of a device capability TLV according to an aspect of an exemplary embodiment.

The screen option field is an option field that is defined when the WFD device has a display panel and the Screen field is set 1. The screen option field has a horizontal size of 1 octet and a vertical size of 1 octet.

FIG. 26 is a diagram showing a video profile TLV according to an aspect of an exemplary embodiment.

A value of the field "Type" of the video profile TLV is "0x01" and a value of the field "Length" is 2. The video profile TLV includes the field "Video Profile bitmap" of 2 octets. In detail, the field "Video Profile bitmap" includes a baseline sub-field and an expansion sub-field.

FIG. 27 is a diagram showing a video profile bitmap of a video profile TLV according to an aspect of an exemplary embodiment.

In detail, the field "Video Profile bitmap" includes a baseline sub-field and an expansion sub-field. The baseline sub-field includes a baseline profile and level information, as codec profile information. The expansion sub-field includes an expansion profile and level information, as codec profile information.

FIG. 28 is a diagram showing a baseline sub-field of a video profile TLV according to an aspect of an exemplary embodiment.

As shown in FIG. 28, the baseline sub-field includes a bit for determining whether level 1 is supported and a bit for determining whether level 2 is supported.

FIG. 29 is a diagram showing an audio profile TLV according to an aspect of an exemplary embodiment.

A value of the field "Type" of the audio profile TLV is "0x02". A value of the field "Length" is 2. The audio profile TLV includes the field "Audio Profile Bitmap" having 1 octet.

FIG. 30 is a diagram showing an audio profile bitmap field of an audio profile TLV according to an aspect of an exemplary embodiment.

The field "Audio Profile Bitmap" includes a bit for determining whether 16-bit linear pulse code modulation (LPCM) is supported at 48 KHz stereo and a data rate of 1536 Kbps, a bit for determining whether advanced audio coding (AAC) is supported using a low complexity profile, 2 channels, and a data rate of 128 Kbps, a bit for determining whether Dolby Digital 5.1 is supported at a data rate of 576 Kbps, a bit for determining whether digital theater system (DTS) 5.1 is supported at a data rate of 768 Kbps, a bit for determining whether 16 bit LPCM is supported at 48 KHz stereo, 6 channels, and a data rate of 4608 Kbps, a bit for determining whether Dolby Digital Plus is supported at a data rate up to 1.7 Mbps, a bit for determining whether Dolby TrueHD is supported at a data rate up to 18 Mbps, and a bit for determining whether DTS HD Master is supported at a data rate up to 25.4 Mbps.

FIG. 31 is a diagram showing a transport capability TLV according to an aspect of an exemplary embodiment.

A value of the field "Type" of the transport capability TLV is "0x03". A value of the field "Length" is 2. The transport capability TLV includes the field "Error Feedback" having 1 octet and the field "Back Channel Support" having 1 octet.

FIG. 32 is a diagram showing an error feedback field of a transport capability TLV according to an aspect of an exemplary embodiment.

The field "Error Feedback" includes a bit for determining the number of currently established RTP sessions, a bit for determining the maximum supportable number of RTP sessions, a bit for determining whether a real-time transmission protocol (RTP)/audio video profile (AVP) is supported, and a bit for determining whether a RTP/audio-visual profile with feedback (AVPF) is supported.

FIG. 33 is a diagram showing a back channel support field of a transport capability TLV according to an aspect of an exemplary embodiment.

The field "Back Channel Support" includes a bit for determining whether a keyboard is an input device, bits for determining whether single/plural coordinate pointers are supported, and a bit for determining whether a function code is supported via a remote control.

FIG. 34 is a diagram showing a system information TLV according to an aspect of an exemplary embodiment.

A value of the field "Type" of the system information TLV is "0x04". A value of the field "Length" is 46. The system information TLV includes a production code as shown in FIG. 35.

Figures 35, 36:
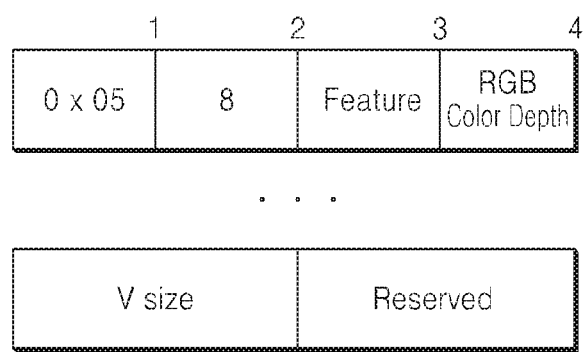
FIG. 35 shows a field of a system information TLV according to an aspect of an exemplary embodiment.
FIG. 36 shows a display capability TLV according to an aspect of an exemplary embodiment.

FIG. 35 is a diagram showing a field of a system information TLV according to an aspect of an exemplary embodiment.

The system information TLV includes a production code, a product code, a production date, a serial number, serial number detail, and a product name.

The production code is a 4-byte ASCII code. The product code is a 2-byte code allocated by a manufacturer. The serial number is a 4-byte code. The serial number detail is a 16-byte ASCII code, indicating the detail of a serial number. The product name is a 16-byte ASCII code, indicating the name of a product.

FIG. 36 is a diagram showing a display capability TLV according to an aspect of an exemplary embodiment.

A value of the field "Type" of the display capability TLV is "0x05". A value of the field "Length" is 8. The display capability TLV includes a supported feature field, an RGB color depth field, and the like, as shown in FIG. 37.

FIG. 37 is a diagram showing a field of a display capability TLV according to an aspect of an exemplary embodiment.

The display capability TLV includes information regarding a supported feature, RGB color depth, YCbCr 444 color depth, horizontal screen size, and vertical screen size.

The supported feature includes a bit for determining whether pivoting is supported, a bit for determining whether "YCbCr 4:4:4" is supported, a bit for determining whether "YCbCr 4:4:2" is supported, and a bit for determining whether "underscan" is supported.

The RGB color depth includes a bit for determining whether RGB is supported as 24 bits per color pixel, a bit for determining whether RGB is supported as 30 bits per color pixel, a bit for determining whether RGB is supported as 36 bits per color pixel, and a bit for determining whether RGB is supported as 48 bits per color pixel.

The YCbCr 444 color depth includes a bit for determining whether YCbCr is supported as 24 bits per color pixel, a bit for determining whether YCbCr is supported as 30 bits per color pixel, a bit for determining whether YCbCr is supported as 36 bits per color pixel, and a bit for determining whether YCbCr is supported as 48 bits per color pixel.

The YCbCr 442 color depth includes a bit for determining whether YCbCr is supported as 16 bits per color pixel, a bit for determining whether YCbCr is supported as 24 bits per color pixel, a bit for determining whether YCbCr is supported as 30 bits per color pixel, and a bit for determining whether YCbCr is supported as 36 bits per color pixel.

The horizontal screen size includes a value corresponding to horizontal screen size in millimeters (mm).

The vertical screen size includes a value corresponding to vertical screen size in millimeters (mm).

FIG. 38 is a diagram showing a 3D capability TLV according to an aspect of an exemplary embodiment.

A value of the field "Type" of the 3D capability TLV is "0x06". A value of the field "Length" is 2. The 3D capability TLV includes a bit for determining a status code as shown in FIG. 39.

FIG. 39 is a diagram showing a field of a 3D capability TLV according to an aspect of an exemplary embodiment.

The 3D capability TLV includes bits for setting up status codes, a bit for determining whether "Frame packing" is supported, a bit for determining whether "Field packing" is supported, a bit for determining whether "Line alternative" is supported, a bit for determining whether "Full Side-by-Side" is supported, a bit for determining whether "Half Side-by-Side" is supported, a bit for determining whether "L+depth" is supported, a bit for determining whether "L+depth+Gfx+G-depth" is supported, and a bit for determining whether "Frame Sequential" is supported.

Figure 40:
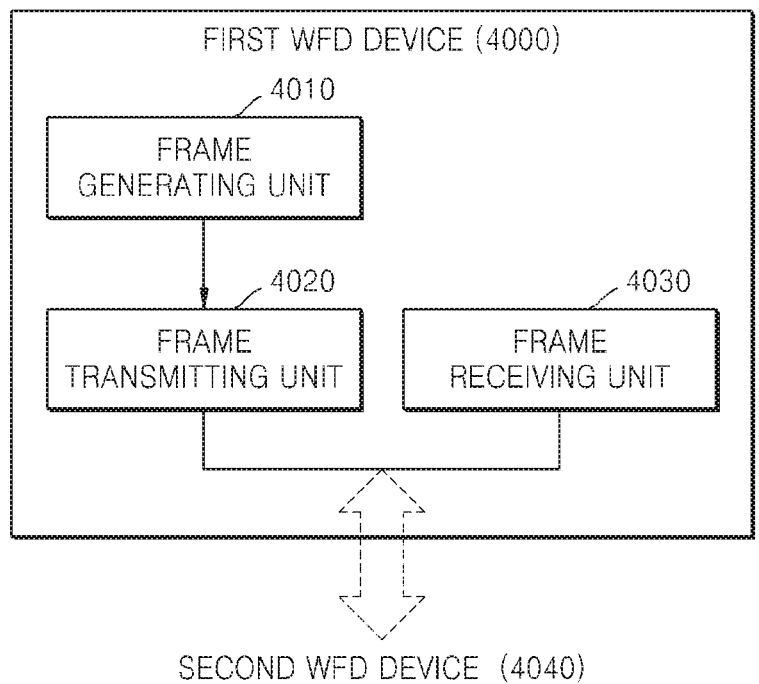
FIG. 40 shows the structure of a first WFD device according to an aspect of an exemplary embodiment.

FIG. 40 is a diagram showing the structure of a first WFD device 4000 according to an aspect of an exemplary embodiment.

The first WFD device 4000 includes a frame generating unit 4010, a frame transmitting unit 4020, and a frame receiving unit 4030. A WFD discovers services supported by another WFD device in a layer 2 pre-association stage in a WFD network.

The frame generating unit 4010, e.g. frame generator, may be implemented as a processor and generates a service discovery request frame for discovering services supported by a second WFD device of a WFD network. The service discovery request frame is generated by using an 802.11u GAS initial request frame The 802.11u GAS initial request frame includes a service protocol type, a service information type, and a service name. The service protocol type may include identifiers of all protocols, or alternatively, may include an identifier for identifying a WiFi display protocol or an identifier of a vendor expansion protocol. The service information type includes an identifier corresponding to any one of information regarding a service name, service information detail, and vendor expansion information. The service name includes a name of a corresponding service requested.

The frame transmitting unit 4020 transmits a service discovery request frame to a second WFD device.

The frame receiving unit 4030 receives a service discovery response frame from the second WFD device in response to the service discovery request frame.

Furthermore, the first WFD device 4000 may further include a connection setup unit (not shown). The connection setup unit selectively establishes a layer 2 secure connection to a second WFD device based on information regarding services supported by the second WFD device, which is included in the service discovery response frame.

A first WFD device and a second WFD device may be Wi-Fi display certified devices.

Figure 41:
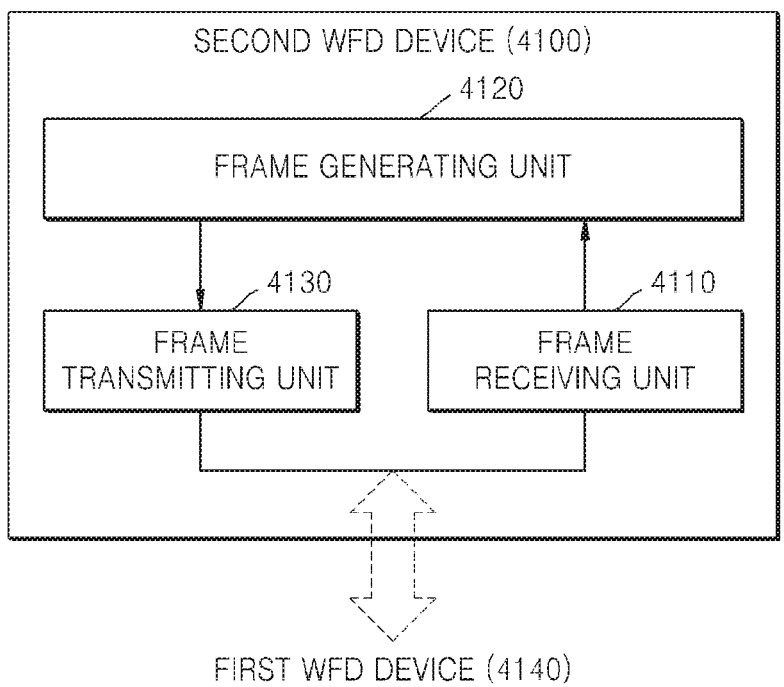
FIG. 41 shows the structure of a second WFD device according to an aspect of an exemplary embodiment.

FIG. 41 is a block diagram showing the structure of a second WFD device 4100 according to an aspect of an exemplary embodiment.

The second WFD device 4100 includes a frame receiving unit 4110, a frame generating unit 4120, and a frame transmitting unit 4130.

The frame receiving unit 4110 receives a service discovery request frame from a first WFD device. The frame transmitting unit may be implemented as a transmitter and the frame receiving unit may be implemented as a receiver.

The frame generating unit 4120 generates a service discovery response frame in response to the service discovery request frame. The service discovery response frame is generated by using an 802.11u GAS initial response frame.

The 802.11u GAS initial response frame includes a service protocol type, a service information type, a status code, and service information. The service protocol type may include an identifier for identifying a requested WiFi display service or an identifier of a vendor expansion protocol. The service information type includes an identifier corresponding to any one of information requested from among a service name, service information detail, and vendor expansion information. The status code includes information regarding a result of a service information request. The service information includes service information requested based on the service information type.

The service information includes at least one of device capability information, video profile information, audio profile information, transport capability information, system information, display capability information, and 3D capability information, and an identifier thereof.

The frame transmitting unit 4130 transmits a service discovery response frame to a first WFD device.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

For example, as shown in FIGS. 40 and 41, each of the first WFD device 4000 and the second WFD device 4100 according to an aspect of an exemplary embodiment may include a bus connected to each component, at least one processor connected to the bus, and a memory, which is connected to the bus to store commands, received messages, or generated messages and is connected to the at least one processor for executing the commands as stated above.

Exemplary embodiments can also be embodied as computer-readable codes on a computer-readable recording medium. Examples of the computer-readable recording medium include magnetic storage media (e.g., ROM, floppy disks, hard disks, etc.), storage media such as optical recording media (e.g., CD-ROMs, or DVDs), etc. The computer-readable recording medium can also be distributed over network-coupled computer systems so that the computer-readable code is stored and executed in a distributed fashion.

The invention claimed is:

1. A method for a first Wi-Fi direct (WFD) device to discover a Wi-Fi display service in a WFD network, the method comprising:

generating, performed by at least one processor, a service discovery request frame for discovering a service supported by a second WFD device in the WFD network;

transmitting, performed by the at least one processor, the service discovery request frame to the second WFD device; and receiving, performed by the at least one processor, a service discovery response frame from the second WFD device in response to the service discovery request frame, wherein the service discovery request frame and the service discovery response frame are generated by using a generic advertising service (GAS) initial request frame of 802.11u and a GAS initial response frame of 802.11u, respectively, and wherein the GAS initial request frame comprises information regarding a service protocol type, and the information of the service protocol type comprises an identifier for identifying a Wi-Fi display protocol.

2. The method of claim 1, wherein the GAS initial request frame further comprises a service information type and a service name, wherein the service information type comprises an identifier corresponding to any one of information regarding a service name, service information detail, and vendor expansion information, and wherein the service name comprises a name of a corresponding service of which service information is to be requested.

3. The method of claim 1, wherein the GAS initial response frame further comprises the service protocol type, a service information type, a status code, and service information, wherein the service protocol type comprises an identifier for identifying the Wi-Fi display service or an identifier of a vendor expansion protocol, wherein the service information type comprises an identifier corresponding to any one of information requested from among a service name, service information detail, and vendor expansion information, wherein the status code comprises information regarding a result of a service information request, and wherein the service information comprises service information requested based on the service information type.

4. The method of claim 3, wherein the service information comprises at least one of device capability information, video profile information, audio profile information, transport capability information, system information, display capability information, and three-dimensional (3D) capability information, and an identifier thereof.

5. The method of claim 1, further comprising selectively establishing a layer 2 secure connection to the second WFD device based on information regarding services supported by the second WFD device, which is included in the service discovery response frame.

6. The method of claim 1, wherein the first WFD device and the second WFD device are Wi-Fi display certified devices.

7. A method for a second Wi-Fi direct (WFD) device to discover a Wi-Fi display service in a WFD network, the method comprising:
receiving, performed by at least one processor, a service discovery request frame for discovering a service supported by the second WFD device of the WFD network from a first WFD device;
generating, performed by the at least one processor, a service discovery response frame in response to the service discovery request frame; and
transmitting, performed by the at least one processor, the service discovery response frame to the first WFD device,
wherein the service discovery request frame and the service discovery response frame are generated by using a generic advertising service (GAS) initial request frame of 802.11u and a GAS initial response frame of 802.11u, respectively, and
wherein the GAS initial request frame comprises information regarding a service protocol type, and the information of the service protocol type comprises an identifier for identifying a Wi-Fi display protocol.

8. The method of claim 7, wherein the GAS initial request frame comprises a service information type and a service name,
wherein the service information type comprises an identifier corresponding to any one of information regarding a service name, service information detail, and vendor expansion information, and
wherein the service name comprises a name of a corresponding service of which service information is to be requested.

9. The method of claim 7, wherein the GAS initial response frame further comprises the service protocol type, a service information type, a status code, and service information,
wherein the service protocol type comprises an identifier for identifying the Wi-Fi display service or an identifier of a vendor expansion protocol,
wherein the service information type comprises an identifier corresponding to any one of information requested from among a service name, service information detail, and vendor expansion information,
wherein the status code comprises information regarding a result of a service information request, and
wherein the service information comprises service information requested based on the service information type.

10. The method of claim 9, wherein the service information comprises at least one of device capability information, video profile information, audio profile information, transport capability information, system information, display capability information, and three-dimensional (3D) capability information, and an identifier thereof.

11. The method of claim 7, wherein the first WFD device and the second WFD device are Wi-Fi display certified devices.

12. A first Wi-Fi direct (WFD) device in a WFD network, the first WFD device comprising:
a frame generator comprising a processor which generates a service discovery request frame for discovering a service supported by a second WFD device in the WFD network;
a frame transmitter which transmits the service discovery request frame to the second WFD device; and
a frame receiver which receives a service discovery response frame from the second WFD device in response to the service discovery request frame,
wherein the service discovery request frame and the service discovery response frame are generated by using an 802.11u generic advertising service (GAS) initial request frame and an 802.11u GAS initial response frame, respectively, and
wherein the GAS initial request frame comprises information regarding a service protocol type, and the information of the service protocol type comprises an identifier for identifying a Wi-Fi display protocol.

13. A second Wi-Fi direct (WFD) device in a WFD network, the second WFD device comprising:
a frame receiver which receives a service discovery request frame for discovering a service supported by the second WFD device of the WFD network from a first WFD device;
a frame generator comprising a processor which generates a service discovery response frame in response to the service discovery request frame; and
a frame transmitter which transmits the service discovery response frame to the first WFD device,
wherein the service discovery request frame and the service discovery response frame are generated by using an 802.11u generic advertising service (GAS) initial request frame and an 802.11u GAS initial response frame, respectively, and
wherein the GAS initial request comprises information regarding a service protocol type, and the information of the service protocol type comprises an identifier for identifying a Wi-Fi display protocol.

14. A non-transitory computer-readable recording medium having recorded thereon a computer program that is executable by at least one processor to perform the method of claim 1.

15. A non-transitory computer-readable recording medium having recorded thereon a computer program that is executable by at least one processor to perform the method of claim 7.

* * * * *